United States Patent
Lee et al.

(10) Patent No.: US 8,452,339 B2
(45) Date of Patent: May 28, 2013

(54) MOBILE TERMINAL AND METHOD OF CONTROLLING THE SAME

(75) Inventors: Sunjung Lee, Seoul (KR); Kyunghye Seo, Seoul (KR); Hoyoung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 433 days.

(21) Appl. No.: 12/770,045

(22) Filed: Apr. 29, 2010

(65) Prior Publication Data

US 2011/0165913 A1 Jul. 7, 2011

(30) Foreign Application Priority Data

Jan. 7, 2010 (KR) .................. 10-2010-0001145

(51) Int. Cl.
*H04W 88/102* (2006.01)
*G06F 3/041* (2006.01)

(52) U.S. Cl.
USPC .......................................... 455/566; 345/173

(58) Field of Classification Search
USPC ............... 455/566, 500.1, 575.1; 345/173
See application file for complete search history.

(56) References Cited

U.S. PATENT DOCUMENTS

| | | | |
|---|---|---|---|
| 6,339,437 B1* | 1/2002 | Nielsen ........................ | 715/787 |
| 2010/0130280 A1* | 5/2010 | Arezina et al. .................. | 463/20 |
| 2010/0251152 A1* | 9/2010 | Cho et al. ...................... | 715/765 |
| 2010/0275150 A1* | 10/2010 | Chiba et al. ................... | 715/784 |

* cited by examiner

*Primary Examiner* — Melody Mehrpour
(74) *Attorney, Agent, or Firm* — Birch, Stewart, Kolasch & Birch, LLP

(57) ABSTRACT

A mobile terminal and a method of controlling the same are disclosed. The mobile terminal includes a touch screen displaying at least one item and a scroll bar that receives a first touch signal for renewing at least one of the at least one item and displaying the item, and a controller changing the appearance of the scroll bar when receiving a second touch signal for selecting at least one of the item and moving the selected item to the scroll bar. When a touch signal for moving an item to the scroll bar is input, the display state of the scroll bar is changed, and thus it is possible to easily indicate whether an item is selected without setting an additional region.

39 Claims, 18 Drawing Sheets

MOBILE TERMINAL AND METHOD OF CONTROLLING THE SAME

This application claims the benefit of Korean Patent Application No. 10-2010-0001145 filed on Jan. 7, 2010 which are hereby incorporated by reference.

BACKGROUND

1. Field

The present invention relates to a mobile terminal and a method of controlling the same, and more particularly, to a mobile terminal and a method of controlling the same for changing a display state of a scroll bar and displaying the scroll bar in the changed display state when a touch signal for moving an item to the scroll bar is received to easily indicate selection of an item and whether an item is selected without setting an additional region.

2. Related Art

As the functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether users can personally carry the terminals.

To support and enhance functions of a terminal, it can be considered to improve a structural part and/or a software part of the terminal.

A variety of recent terminals including mobile terminals provide more complex and various functions.

SUMMARY

The present invention provides a mobile terminal and a method of controlling the same for changing a display state of a scroll bar and displaying the scroll bar in the changed display state when a touch signal for moving an item to the scroll bar is received to easily indicate selection of an item and whether an item is selected without setting an additional region.

BRIEF DESCRIPTION OF THE DRAWINGS

The accompany drawings, which are included to provide a further understanding of this document and are incorporated on and constitute a part of this specification illustrate embodiments of this document and together with the description serve to explain the principles of this document.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include a cellular phone, a smart phone, a laptop computer, a digital broadcasting terminal, personal digital assistants (PDA), a portable multimedia player (PMP), a navigation system and so on.

Figure 1:
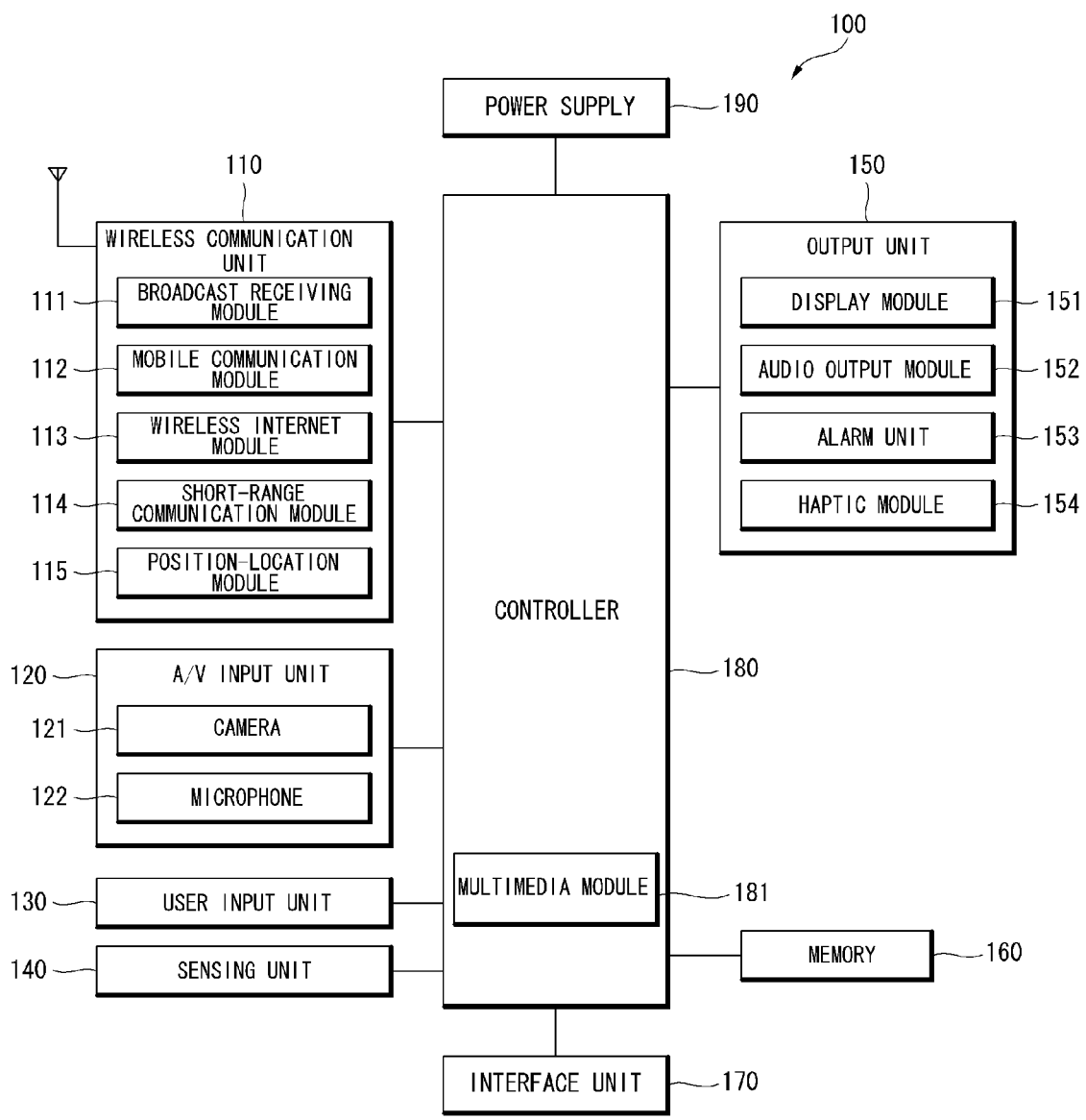
FIG. 1 is a block diagram of a mobile terminal according to an embodiment of the present invention.

FIG. 1 is a block diagram of a mobile terminal 100 according to an embodiment of the present invention. The mobile terminal 100 can include a radio communication unit 110, an audio/video (A/V) input unit 120, a user input unit 130, a sensing unit 140, an output unit 150, a memory 160, an interface 170, a controller 180, and a power supply 190. The components shown in FIG. 1 are not essential parts and the number of components included in the mobile terminal can be varied.

The components of the mobile terminal will now be described.

The radio communication unit 110 can include at least one module that enables radio communication between the mobile terminal 100 and a radio communication system or between the mobile terminal 100 and a network in which the mobile terminal 100 is located. For example, the radio communication unit 110 can include a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel.

The broadcasting channel can include a satellite channel and a terrestrial channel. The broadcasting management server can be a server that generates and transmits broadcasting signals and/or broadcasting related information or a server that receives previously created broadcasting signals and/or broadcasting related information and transmits the broadcasting signals and/or broadcasting related information to a terminal. The broadcasting signals can include not only TV broadcasting signals, radio broadcasting signals and data broadcasting signals but also signals in the form of combination of a TV broadcasting signal and a radio broadcasting signal.

The broadcasting related information can be information on a broadcasting channel, a broadcasting program or a broadcasting service provider. The broadcasting related information can be provided even through a mobile communication network. In this case, the broadcasting related information can be received by the mobile communication module 112.

The broadcasting related information can exist in various forms. For example, the broadcasting related information can exist in the form of electronic program guide (EPG) of digital multimedia broadcasting (DMB) or in the form of electronic service guide (ESG) of digital video broadcast-handheld (DVB-H).

The broadcasting receiving module 111 receives broadcasting signals using various broadcasting systems. Particularly, the broadcasting receiving module 111 can receive digital broadcasting signals using digital broadcasting systems such as digital multimedia broadcasting-terrestrial (DMB-T), digital multimedia broadcasting-satellite (DMB-S), media forward link only (MediaFLO), DVB-H and integrated services digital broadcast-terrestrial (ISDB-T) systems. The broadcasting receiving module 111 can be constructed to be suited to broadcasting systems providing broadcasting signals other than the above-described digital broadcasting systems.

The broadcasting signals and/or broadcasting related information received through the broadcasting receiving module 111 can be stored in the memory 160.

The mobile communication module 112 transmits/receives a radio signal to/from at least one of a base station, an external terminal and a server on a mobile communication network. The radio signal can include a voice call signal, a video telephony call signal or data in various forms according to transmission and receiving of text/multimedia messages.

The wireless Internet module 113 means a module for wireless Internet access and can be included in the mobile terminal 100 or externally attached to the mobile terminal 100. Wireless LAN (WLAN) (Wi-Fi), wireless broadband (Wibro), world interoperability for microwave access (Wimax), high speed downlink packet access (HSDPA) and so on can be used as a wireless Internet technique.

The local area communication module 114 means a module for local area communication. Bluetooth, radio frequency identification (RFID), infrared data association (IrDA), ultra wideband (UWB) and ZigBee can be used as a local area communication technique.

The position information module 115 confirms or obtains the position of the mobile terminal. A global positioning system (GPS) module is a representative example of the position information module 115. According to the current technology, the GPS module 115 can calculate information on distances between one point (object) and at least three satellites and information on the time when the distance information is measured and apply trigonometry to the obtained distance information to obtain three-dimensional position information on the point (object) according to latitude, longitude and altitude at a predetermined time. Furthermore, a method of calculating position and time information using three satellites and correcting the calculated position and time information using another satellite is also used. In addition, the GPS module 115 continuously calculates the current position in real time and calculates velocity information using the position information.

Referring to FIG. 1, the A/V input unit 120 is used to input an audio signal or a video signal and can include a camera 121 and a microphone 122. The camera 121 processes image frames of still images or moving images obtained by an image sensor in a video telephony mode or a photographing mode. The processed image frames can be displayed on a display unit 151.

The image frames processed by the camera 121 can be stored in the memory 160 or transmitted to an external device through the radio communication unit 110. The mobile terminal 100 can include at least two cameras according to constitution of the terminal.

The microphone 122 receives an external audio signal in a call mode, a recording mode or a speed recognition mode and processes the received audio signal into electric audio data. The audio data can be converted into a form that can be transmitted to a mobile communication base station through the mobile communication module 112 and output in the call mode. The microphone 122 can employ various noise removal algorithms for removing noise generated when the external audio signal is received.

The user input unit 130 receives input data for controlling the operation of the terminal from a user. The user input unit 130 can include a keypad, a dome switch, a touch pad (constant voltage/capacitance), jog wheel, jog switch and so on.

The sensing unit 140 senses the current state of the mobile terminal 100, such as open/close state of the mobile terminal 100, the position of the mobile terminal 100, whether a user touches the mobile terminal 100, the direction of the mobile terminal 100 and acceleration/deceleration of the mobile terminal 100 and generates a sensing signal for controlling the operation of the mobile terminal 100. For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can include a proximity sensor.

The output unit 150 generates visual, auditory or tactile output and can include the display unit 151, an audio output module 152, an alarm 153 and a haptic module 154.

The display unit 151 displays information processed by the mobile terminal 100. For example, the display unit 151 displays UI or graphic user interface (GUI) related to a telephone call when the mobile terminal is in the call mode. The display unit 151 displays a captured or/and received image, UI or GUI when the mobile terminal 100 is in the video telephony mode or the photographing mode.

The display unit 151 can include at least one of a liquid crystal display, a thin film transistor liquid crystal display, an organic light-emitting diode display, a flexible display and a three-dimensional display.

Some of these displays can be of a transparent type or a light transmission type. This can be referred to as a transparent display. The transparent display includes a transparent liquid crystal display. The rear structure of the display unit 151 can also be of the light transmission type. According to this structure, a user can see an object located behind the body of the mobile terminal 100 through an area of the body of the mobile terminal 100, which is occupied by the display unit 151.

The mobile terminal 100 can include at least two display units 151 according to constitution of the terminal. For example, the mobile terminal 100 can include a plurality of displays that are arranged on a single face at a predetermined distance or integrated. Otherwise, the plurality of displays can be arranged on different sides.

In the case where the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

The touch sensor can be constructed such that it converts a variation in pressure applied to a specific portion of the display unit 151 or a variation in capacitance generated at a specific portion of the display unit 151 into an electric input signal. The touch sensor can be constructed such that it can sense pressure of touch as well as the position and area of touch.

When touch input is applied to the touch sensor, a signal corresponding to the touch input is transmitted to a touch controller. The touch controller processes the signal and transmits data corresponding to the processed signal to the controller 180. Accordingly, the controller 180 can detect a touched portion of the display 151.

Referring to FIG. 1, the proximity sensor 141 can be located in an internal region of the mobile terminal, surrounded by the touch screen, or near the touch screen. The proximity sensor senses an object approaching a predetermined sensing face or an object located near the proximity sensor using electromagnetic force or infrared rays without having mechanical contact. The proximity sensor has lifetime longer than that of a contact sensor and has wide application.

The proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

A capacitive touch screen is constructed such that proximity of a pointer is detected through a variation in an electric field according to the proximity of the pointer. In this case, the touch screen (touch sensor) can be classified as a proximity sensor.

For convenience of explanation, an action of approaching the pointer to the touch screen while the pointer it not being in contact with the touch screen such that location of the pointer on the touch screen is recognized is referred to as "proximity touch" and an action of bring the pointer into contact with the touch screen is referred to as "contact touch" in the following description. A proximity touch point of the pointer on the touch screen means a point of the touch screen to which the pointer corresponds perpendicularly to the touch screen when the pointer proximity-touches the touch screen.

The proximity sensor senses proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be displayed on the touch screen.

The audio output module 152 can output audio data received from the radio communication unit 110 or stored in the memory 160 in a call signal receiving mode, a telephone call mode or a recording mode, a speech recognition mode and a broadcasting receiving mode. The audio output module 152 outputs audio signals related to functions (for example, a call signal incoming tone, a message incoming tone, etc.) performed in the mobile terminal 100. The audio output module 152 can include a receiver, a speaker, a buzzer, etc.

The alarm 153 outputs a signal for indicating generation of an event of the mobile terminal 100. Examples of events generated in the mobile terminal include receiving of a call signal, receiving of a message, input of a key signal, input of touch, etc. The alarm 153 can output signals in forms different from video signals or audio signals, for example, a signal for indicating generation of an event through vibration. The video signals or the audio signals can be also output through the display unit 151 or the audio output module 152.

The haptic module 154 generates various haptic effects that the user can feel. A representative example of the haptic effects is vibration. The intensity and pattern of vibration generated by the haptic module 154 can be controlled. For example, different vibrations can be combined and output or sequentially output.

The haptic module 154 can generate a variety of haptic effects including an effect of stimulus according to arrangement of pins vertically moving for a contact skin face, an effect of stimulus according to jet force or sucking force of air through a jet hole or a sucking hole, an effect of stimulus rubbing the skin, an effect of stimulus according to contact of an electrode, an effect of stimulus using electrostatic force and an effect according to reproduction of cold and warmth using an element capable of absorbing or radiating heat in addition to vibrations.

The haptic module 154 can not only transmit haptic effects through direct contact but also allow the user to feel haptic effects through kinesthetic sense of his fingers or arms. The mobile terminal 100 can include at least two haptic modules 154 according to constitution of the mobile terminal.

The memory 160 can store a program for the operation of the controller 180 and temporarily store input/output data (for example, phone book, messages, still images, moving images, etc.). The memory 160 can store data about vibrations and sounds in various patterns, which are output from when a touch input is applied to the touch screen.

The memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can operate in relation to a web storage performing the storing function of the memory 160 on the Internet.

The interface 170 serves as a path to all external devices connected to the mobile terminal 100. The interface 170 receives data from the external devices or power and transmits the data or power to the internal components of the mobile terminal 100 or transmits data of the mobile terminal 100 to the external devices. The interface 170 can include a wired/wireless headset port, an external charger port, a wired/wireless data port, a memory card port, a port for connecting a device having a user identification module, an audio I/O port, a video I/O port, an earphone port, etc., for example.

An identification module is a chip that stores information for authenticating the authority to use the mobile terminal 100 and can include a user identify module (UIM), a subscriber identify module (SIM) and a universal subscriber identify module (USIM). A device (referred to as an identification device hereinafter) including the identification module can be manufactured in the form of a smart card. Accordingly, the identification device can be connected to the mobile terminal 100 through a port.

The interface 170 can serve as a path through which power from an external cradle is provided to the mobile terminal 100 when the mobile terminal 100 is connected to the external cradle or a path through which various command signals inputted by the user through the cradle to the mobile terminal 100. The various command signals or power input from the cradle can be used as a signal for confirming whether the mobile terminal 100 is correctly set in the cradle.

The controller 180 controls the overall operation of the mobile terminal. For example, the controller 180 performs control and processing for voice communication, data communication and video telephony. The controller 180 can include a multimedia module 181 for playing multimedia. The multimedia module 181 can be included in the controller 180 or separated from the controller 180.

The controller 180 can perform a pattern recognition process capable of recognizing handwriting input or picture-drawing input applied to the touch screen as characters or images.

The power supply 190 receives external power and internal power and provides power required for the operations of the components of the mobile terminal under the control of the controller 180.

Various embodiments of the present invention can be implemented in a computer or similar device readable recording medium using software, hardware or a combination thereof, for example.

According to hardware implementation, the embodiments of the present invention can be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electrical units for executing functions. In some cases, the embodiments can be implemented by the controller 180.

According to software implementation, embodiments such as procedures or functions can be implemented with a separate software module executing at least one function or operation. Software codes can be implemented according to a software application written in an appropriate software language. Furthermore, the software codes can be stored in the memory 160 and executed by the controller 180.

Figure 2A:
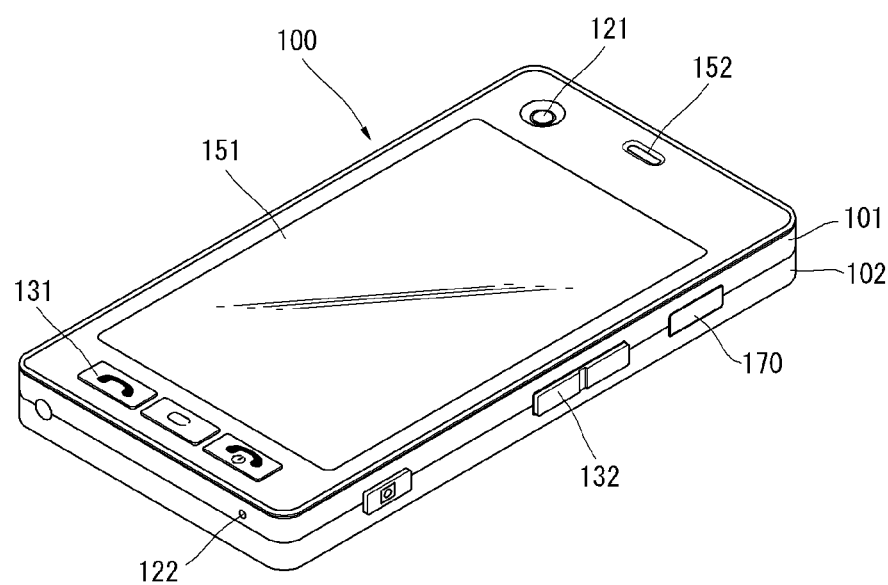
FIG. 2A is a front perspective view of the mobile terminal according to an embodiment of the present invention.

FIG. 2A is a front perspective view of a mobile terminal or a handheld terminal 100 according to an embodiment of the present invention.

The handheld terminal 100 has a bar type terminal body. However, the present invention is not limited to a bar type terminal and can be applied to terminals of various types including slide type, folder type, swing type and swivel type terminals having at least two bodies that are relatively movably combined.

The terminal body includes a case (a casing, a housing, a cover, etc.) forming the exterior of the terminal 100. In the present embodiment, the case can be divided into a front case 101 and a rear case 102. Various electronic components are arranged in the space formed between the front case 101 and the rear case 102. At least one middle case can be additionally arranged between the front case 101 and the rear case 102.

The cases can be formed of plastics through injection molding or made of a metal material such as stainless steel (STS) or titanium (Ti).

The display unit 151, the audio output unit 152, the camera 121, the user input unit 130/131 and 132, the microphone 122 and the interface 170 can be arranged in the terminal body, specifically, in the front case 101.

The display unit 151 occupies most part of the main face of the front case 101. The audio output unit 152 and the camera 121 are arranged in a region in proximity to one of both ends of the display unit 151 and the user input unit 131 and the microphone 122 are located in a region in proximity to the other end of the display unit 151. The user input unit 132 and the interface 170 are arranged on the sides of the front case 101 and the rear case 102.

The user input unit 130 is operated to receive commands for controlling the operation of the handheld terminal 100 and can include a plurality of operating units 131 and 132. The operating units 131 and 132 can be referred to as manipulating portions and employ any tactile manner in which a user operates the operating units 131 and 132 while having tactile feeling.

First and second operating units 131 and 132 can receive various inputs. For example, the first operating unit 131 receives commands such as start, end and scroll and the second operating unit 132 receives commands such as control of the volume of sound output from the audio output unit 152 or conversion of the display unit 151 to a touch recognition mode.

Figure 2B:
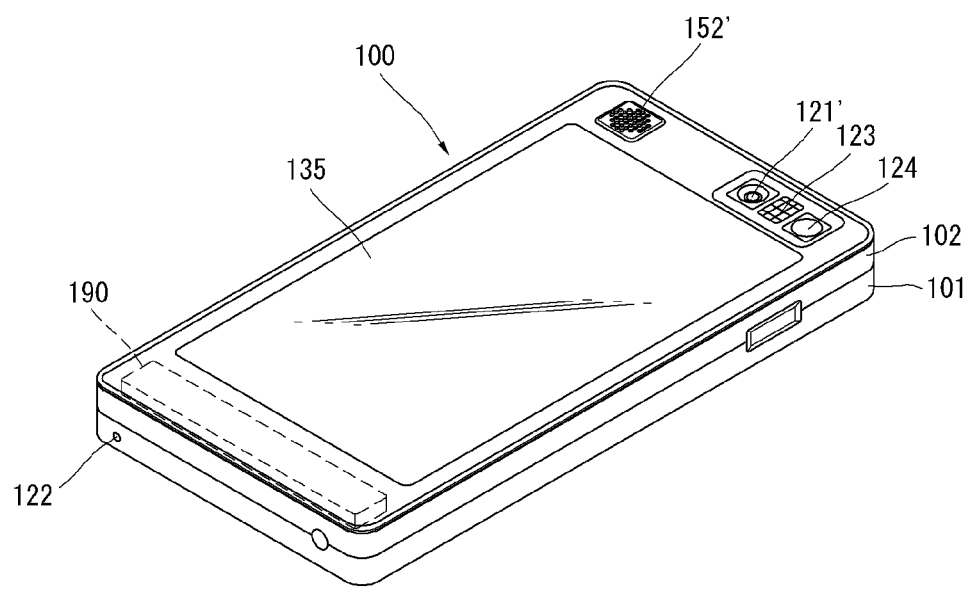
FIG. 2B is a rear perspective view of the mobile terminal according to an embodiment of the present invention.

FIG. 2B is a rear perspective view of the handheld terminal shown in FIG. 2A according to an embodiment of the present invention.

Referring to FIG. 2A, a camera 121' can be additionally attached to the rear side of the terminal body, that is, the rear case 102. The camera 121' has a photographing direction opposite to that of the camera 121 shown in FIG. 2A and can have pixels different from those of the camera 121 shown in FIG. 2A.

For example, it is desirable that the camera 121 has low pixels such that it can capture an image of the face of a user and transmit the image to a receiving part in case of video telephony while the camera 121' has high pixels because it captures an image of a general object and does not immediately transmit the image in many cases. The cameras 121 and 121' can be attached to the terminal body such that they can be rotated or pop-up.

A flash bulb 123 and a mirror 124 are additionally arranged in proximity to the camera 121'. The flash bulb 123 lights an object when the camera 121' takes a picture of the object. The mirror 124 is used for the user to look at his/her face in the mirror when the user wants to self-photograph himself/herself using the camera 121'.

An audio output unit 152' can be additionally provided on the rear side of the terminal body. The audio output unit 152' can achieve a stereo function with the audio output unit 152 shown in FIG. 2A and be used for a speaker phone mode when the terminal is used for a telephone call.

A broadcasting signal receiving antenna 124 can be additionally attached to the side of the terminal body in addition to an antenna for telephone calls. The antenna 124 constructing a part of the broadcasting receiving module 111 shown in FIG. 1 can be set in the terminal body such that the antenna 124 can be pulled out of the terminal body.

The power supply 190 for providing power to the handheld terminal 100 is set in the terminal body. The power supply 190 can be included in the terminal body or detachably attached to the terminal body.

A touch pad 135 for sensing touch can be additionally attached to the rear case 102. The touch pad 135 can be of a light transmission type as the display unit 151. In this case, if the display unit 151 outputs visual information through both sides thereof, the visual information can be recognized through the touch pad 135. The information output through both sides of the display unit 151 can be controlled by the touch pad 135. Otherwise, a display is additionally attached to the touch pad 135 such that a touch screen can be arranged even in the rear case 102.

The touch pad 135 operates in connection with the display unit 151 of the front case 101. The touch pad 135 can be located in parallel with the display unit 151 behind the display unit 151. The touch panel 135 can be identical to or smaller than the display unit 151 in size.

Figure 2C:
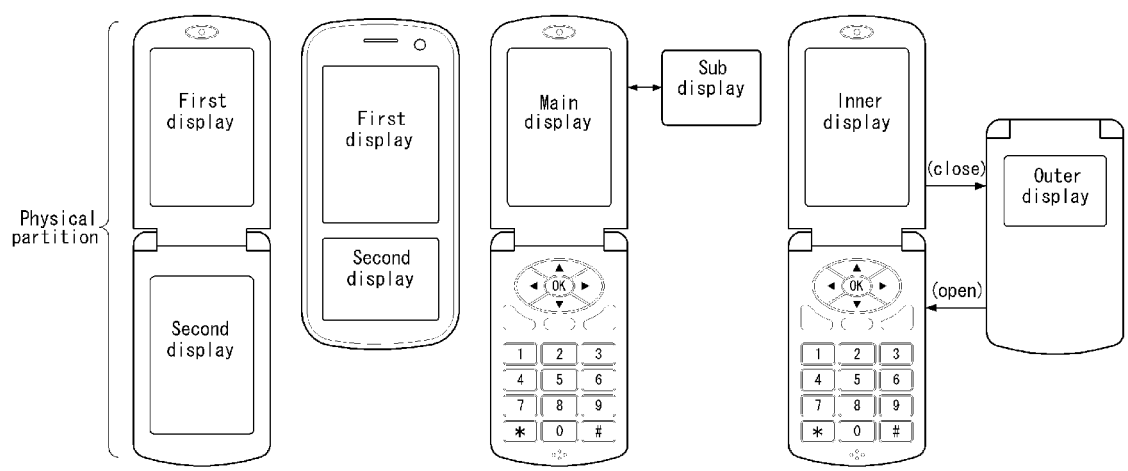
FIGS. 2C and 2D illustrate forms of the mobile terminal and display screens according to various embodiments of the present invention.
Figure 2D:
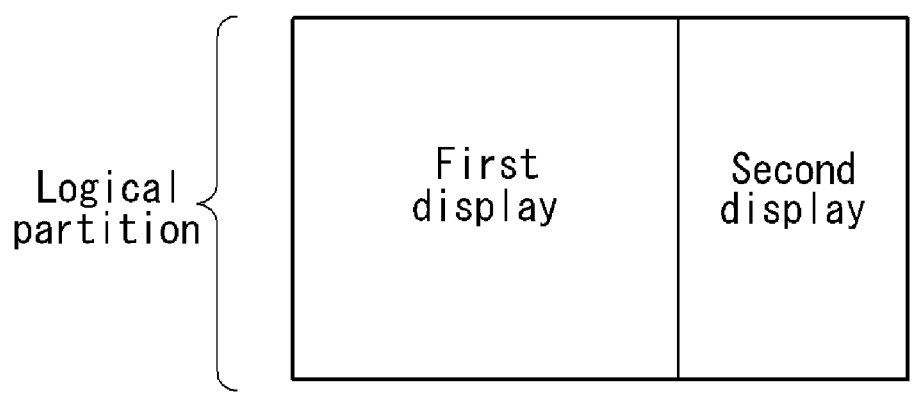

FIGS. 2C and 2D illustrate the mobile terminal 100 and the display unit 151 according to various embodiments of the present invention.

Referring to FIG. 2C, the display unit 151 can include a first display and a second display which are physically separated from each other. In a folder type or slide type mobile terminal having two bodies connected through a hinge or slide, the first display (or main display) can be formed on the inner face or outer face of one of the bodies and the second display (or sub display) can be formed on the inner face or outer face of the other body. The sub display is separated from the mobile terminal and detachably combined with the mobile terminal body through an interface to display data from the mobile terminal 100.

The display unit 151 can include first and second displays which are logically separated from each other in a display panel, as illustrated in FIG. 2D.

Figure 3:
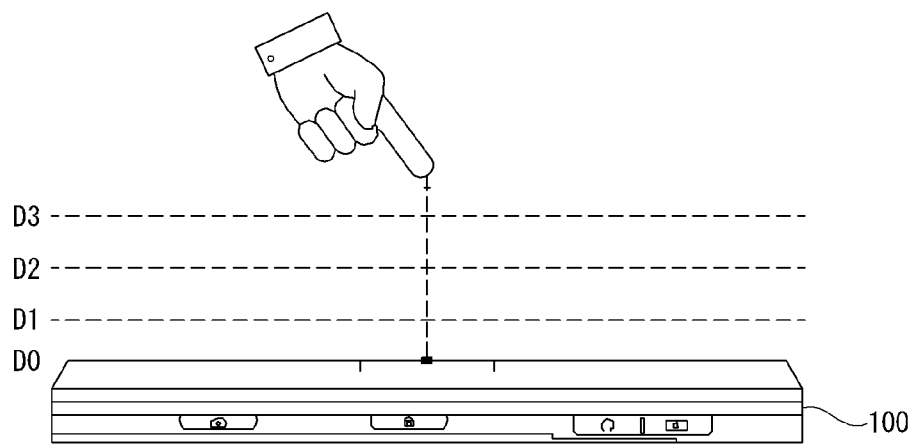
FIG. 3 is a conceptional view for explaining a proximity depth of a proximity sensor.

FIG. 3 is a conceptional view for explaining a proximity depth of the proximity sensor.

As shown in FIG. 3, when a pointer such as a user's finger approaches the touch screen, the proximity sensor located inside or near the touch screen senses the approach and outputs a proximity signal.

The proximity sensor can be constructed such that it outputs a proximity signal according to the distance between the pointer approaching the touch screen and the touch screen (referred to as "proximity depth").

The distance in which the proximity signal is output when the pointer approaches the touch screen is referred to as a detection distance. The proximity depth can be known by using a plurality of proximity sensors having different detection distances and comparing proximity signals respectively output from the proximity sensors.

FIG. 3 shows the section of the touch screen in which proximity sensors capable of sensing three proximity depths are arranged. Proximity sensors capable of sensing less than three or more than four proximity depths can be arranged in the touch screen.

Specifically, when the pointer completely comes into contact with the touch screen (D0), it is recognized as contact touch. When the pointer is located within a distance D1 from the touch screen, it is recognized as proximity touch of a first proximity depth. When the pointer is located in a range between the distance D1 and a distance D2 from the touch screen, it is recognized as proximity touch of a second proximity depth. When the pointer is located in a range between the distance D2 and a distance D3 from the touch screen, it is recognized as proximity touch of a third proximity depth. When the pointer is located at longer than the distance D3 from the touch screen, it is recognized as cancellation of proximity touch.

Accordingly, the controller 180 can recognize the proximity touch as various input signals according to the proximity distance and proximity position of the pointer with respect to the touch screen and perform various operation controls according to the input signals.

Figure 4:
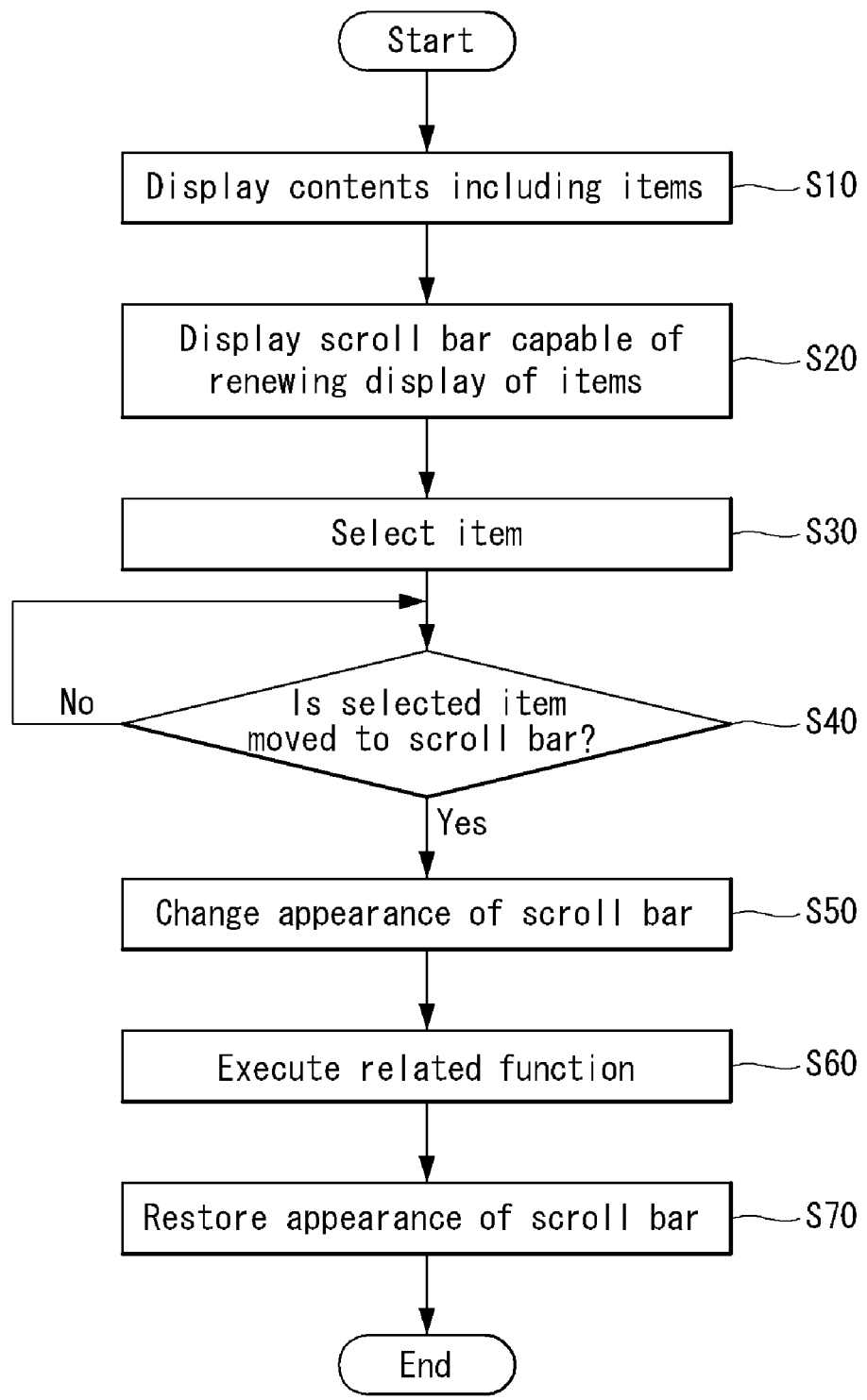
FIG. 4 is a flowchart showing an operation of the mobile terminal according to an embodiment of the present invention.
Figure 5:
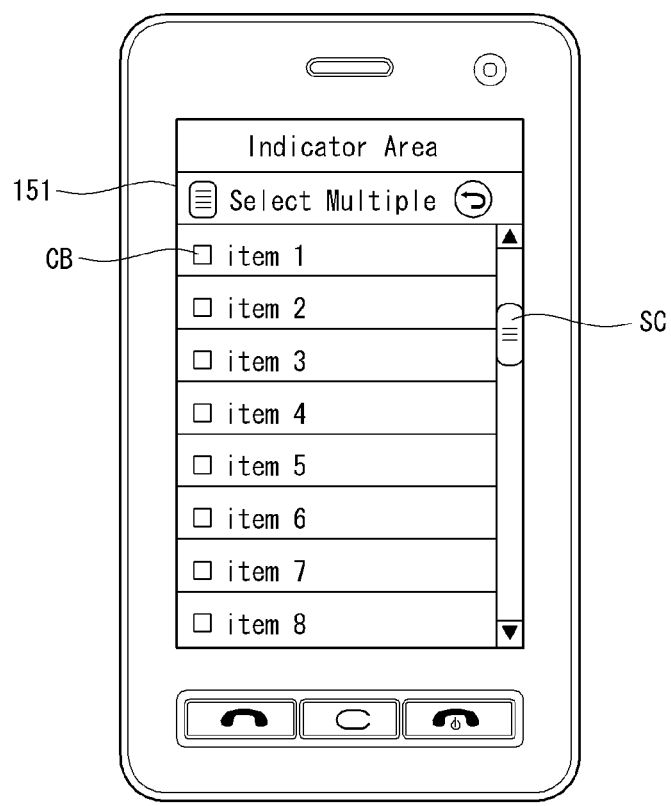
FIG. 5 illustrates contents and a scroll bar displayed on the mobile terminal of FIG. 4.
Figure 6:
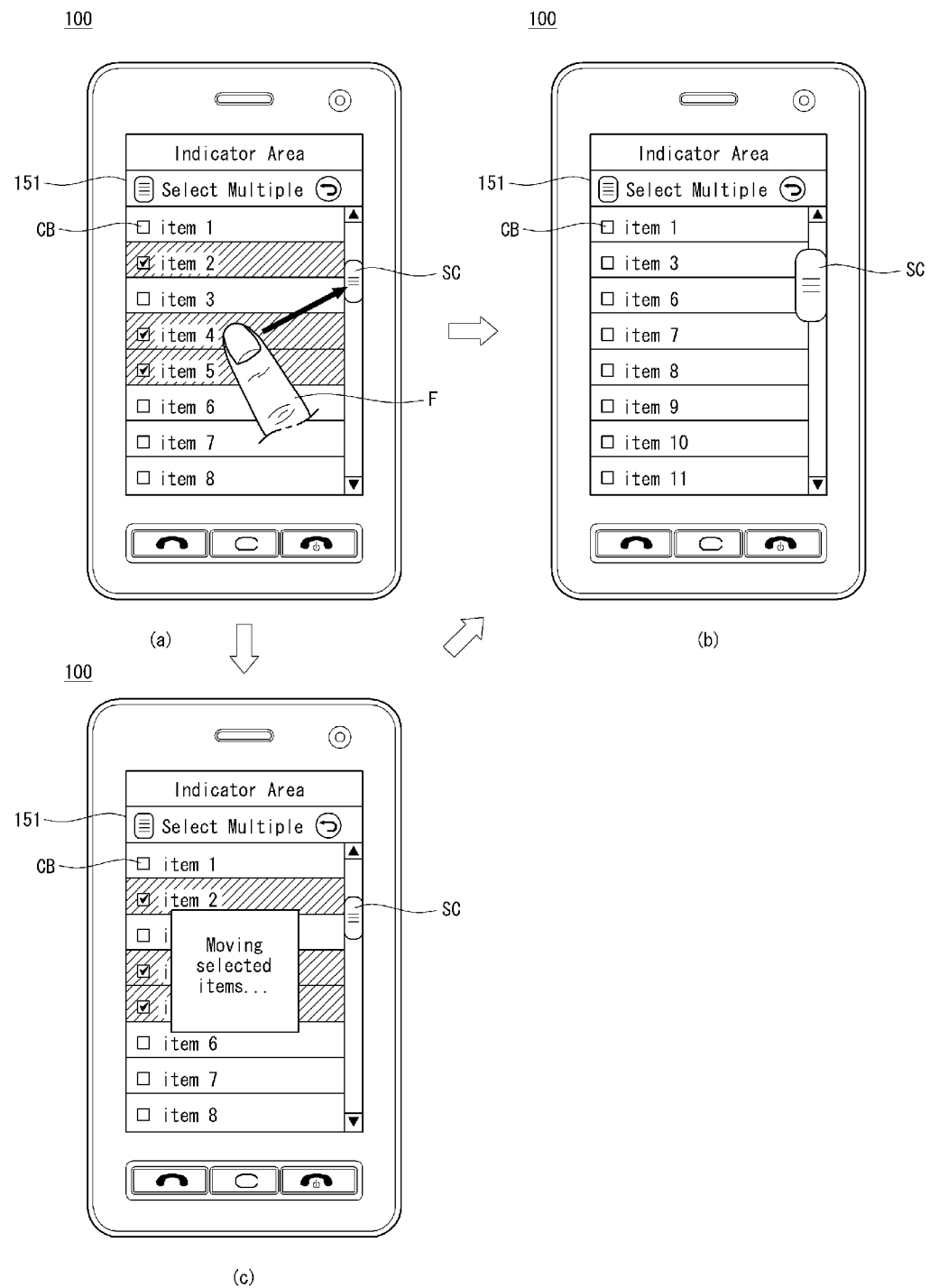
FIGS. 6, 7, 8 and 9 illustrate an operation of the mobile terminal of FIG. 4.

FIG. 4 is a flowchart showing an operation of the mobile terminal 100 according to an embodiment of the present invention and FIG. 5 illustrates contents and a scroll bar displayed on the mobile terminal 100 of FIG. 4.

As shown in FIGS. 4 and 5, contents including items may be displayed on the display unit 151 of the mobile terminal 100 in operation S10, and a scroll bar SC capable of renewing the displayed items may be displayed on the display unit 151 in operation S20.

An item may be specific data. For example, the item may be an individual file such as a music file or a picture file, or data generated by executing a specific function, such as a telephone directory, a call list, a message list, etc. That is, the item may be data required to use the mobile terminal 100 or generated when the mobile terminal 100 is used Contents may be a set of items. For example, the contents may be a folder including picture files if items are picture files. Further, the contents may be a set of message lists if the items are message lists. When the user selects specific contents, for example, a set of message lists, items include in the contents can be displayed on the display unit 151.

Items may be displayed in order from item 1 to item 8, as shown in FIG. 5. However, the form of displaying the items is not limited thereto and any manner of displaying a list on the mobile terminal 100 can be applied to the present invention.

The scroll bar SC may be displayed at one side of the display unit 151. When the number of items included in the contents exceeds the display area of the display unit 151, the scroll bar SC can be displayed at one side of the display unit 151. The scroll bar SC is displayed such that the scroll bar SC can receive a touch input for renewing the display unit 151 in the vertical direction in FIG. 5. However, the scroll bar SC may be displayed such that the scroll bar SC receives a touch input for renewing the display unit 151 in the horizontal direction.

The scroll bar SC can receive a touch input for touching and dragging the scroll bar SC from the user. That is, when the user touches the scroll bar SC and drags the scroll bar SC in the vertical or horizontal direction, the controller (180 shown in FIG. 1) can renew the image displayed on the display unit 151 in the dragging direction.

As described above, the scroll bar SC can be displayed to renew display of the display unit 151 when the number of displayed items exceeds the display area of the display unit 151. In the current embodiment of the present invention, however, the mobile terminal 100 can display the scroll bar SC irrespective of whether the number of items exceeds the display area of the display unit 151. That is, the scroll bar SC of the mobile terminal 100 according to the current embodiment of the present invention has an additional function as well as the function of renewing a display image, and thus the scroll bar SC can be displayed on the display unit 151 to execute the additional function irrespective of the number of items, which will be explained in more detail later.

When the items and the scroll bar SC are displayed on the display unit 151, an item is selected in operation S30.

The user may touch at least one of the displayed items to select the item. When the item is selected, a check box CB corresponding to the selected item may be marked by "v".

Subsequently, it is determined whether the selected item is moved to the scroll bar SC in operation S40.

Items can be moved to the scroll bar SC according to user's choice. That is, when the user inputs a touch for moving the selected item to the scroll bar SC, the controller (180 shown in FIG. 1) may store the item in the scroll bar SC. The user can move the item to the scroll bar SC through a drag-and-drop touch applied to the selected item as a starting point and applied to the scroll bar SC as an end point or a multi-touching operation that touches the item and then touches the scroll bar SC.

When the item is moved to the scroll bar SC, the appearance of the scroll bar SC may be changed in operation S50.

The appearance of the scroll bar SC means the display state of the scroll bar SC and depends on whether there is an item moved to the scroll bar SC. For example, the scroll bar SC may have a first shape before the item is moved to the scroll bar SC and have a second shape after the item is moved to the scroll bar SC. The width or length of the scroll bar SC in the second shape may be greater than that of the scroll bar SC in the first shape. Further, the color of the scroll bar SC may be changed. Since the appearance of the scroll bar SC is changed when the item is moved to the scroll bar SC, the user can be aware of moving of the item intuitively.

The appearance of the scroll bar SC may be changed according to the number of items moved to the scroll bar SC. When a reference number is 0, 5 and 10, for example, the scroll bar SC may have a first shape if the number of items moved to the scroll bar SC is 0, 1, 2, 3, 4 or 5, a second shape if the number of items moved to the scroll bar SC is 5, 6, 7, 8 or 9, and a third shape if the number of items moved to the scroll bar SC is greater than 10. The third shape may be larger than the second shape and the second shape may be larger than the first shape. Since the appearance of the scroll bar SC is changed according to the number of items moved to the scroll bar SC, the user can be aware of the number of items currently moved to the scroll bar SC intuitively.

Subsequently, a related function is executed in operation S60.

The related function may be a function of moving or copying the item moved to the scroll bar SC to a specific position. If the item is a music file, the related function may be playing the music file. The user moves a desired item to the scroll bar SC and then executes a desired function, and thus it is possible to prevent a selected item from being cancelled due to an erroneous operation during the item selecting operation.

Then, the appearance of the scroll bar SC is restored in operation S70.

When the item moved to the scroll bar SC is transferred to a folder, for example, the scroll bar SC may be restored to the initial display state. When the scroll bar SC is restored to the initial form, the user can be aware of that the scroll bar SC does not include any item intuitively.

FIGS. 6, 7, 8 and 9 illustrate an operation of the mobile terminal 100 of FIG. 4.

Referring to FIG. 6(a), the user may select desired items with a finger F. The colors of the selected items may be reversed and check boxes CB corresponding to the selected items may be marked with "v". The user may input a drag-and-drop touch applied to an selected item as a starting point and applied to the scroll bar SC as an end point.

Referring to FIG. 6(b), when all the selected items have been moved to the scroll bar SC through the touching operation, the size of the scroll bar SC can be changed. That is, the width of the scroll bar SC can be increased. Further, the items moved to the scroll bar SC may disappear from the display unit 151. While FIGS. 6(a) and 6(b) show that the items are selected and then moved to the scroll bar SC, it is possible to omit the operation of selecting the items and move the items to the scroll bar SC one by one.

Referring to FIG. 6(c), a message representing which function is executed on the selected items may be displayed on the display unit 151. The user can easily use the mobile terminal 100 because the display unit 151 displays the currently executed function. The function may be predetermined by the user or the controller (180 shown in FIG. 1) before the operation of selecting the items or selected when the operation of selecting the items is carried out.

While FIGS. 6(a), 6(b) and 6(c) show the operation of moving the items to the scroll bar SC through a drag-and-drop touch, the items may be moved to the scroll bar SC through a multi-touch operation that selects the items and then selects the scroll bar SC.

Figure 7:
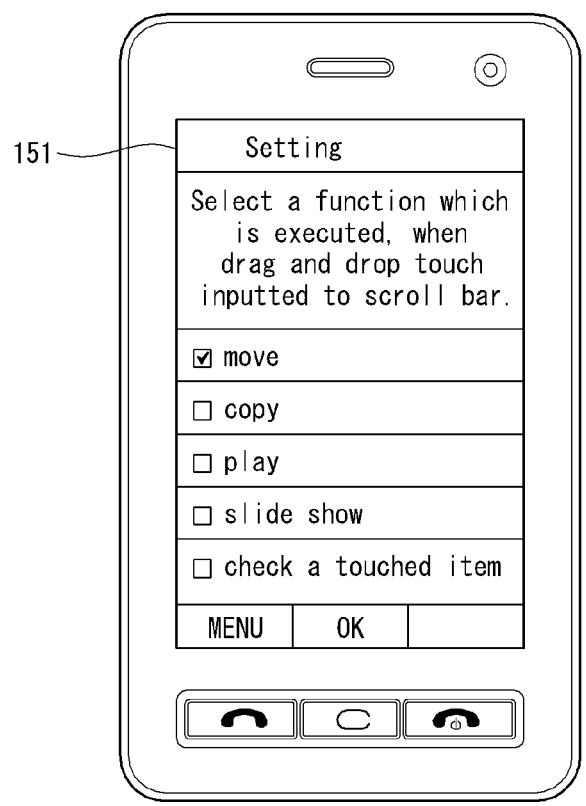
Figure 8:
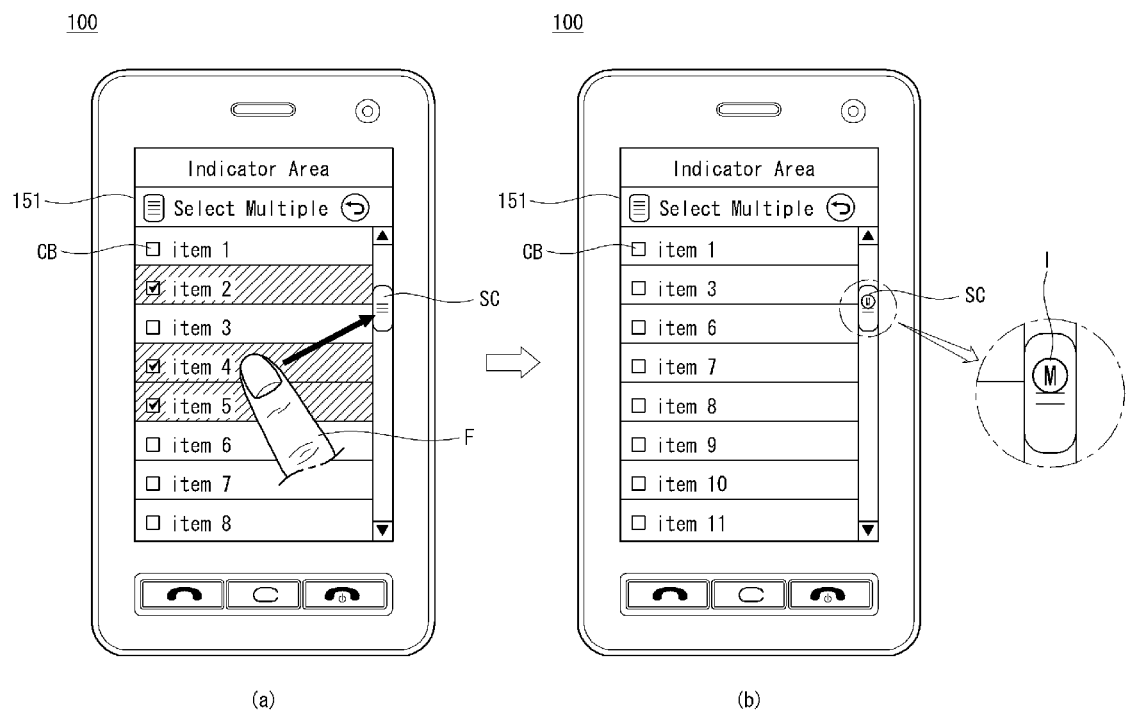
Figure 9:
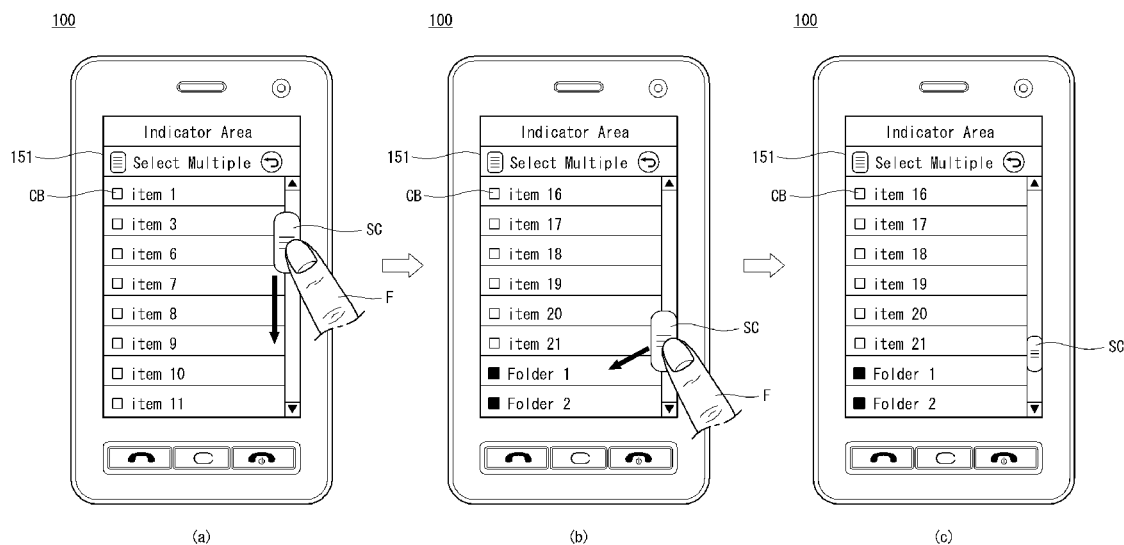

Referring to FIG. 7, the mobile terminal 100 may select a function to be performed on a selected item. That is, the user can set functions of moving, copying and playing a selected item. As described above, the functions can be predetermined or a function to be performed on an item can be selected when the item is selected.

Referring to FIG. 8(a), the user may input a touch for selecting an item and moving the item to the scroll bar SC.

Referring to FIG. 8(b), an icon I corresponding to an executed function may be displayed on the scroll bar SC. Specifically, an icon "M" may be displayed when an item is moved to the scroll bar SC, an icon "C" may be displayed when an item is copied. Further, an icon identified by a color or an icon corresponding to the number of moved or copied items may be displayed.

Referring to FIG. 9(a), the user may move the scroll bar SC up and down to display desired items on the display unit 151.

Referring to FIG. 9(b), the user may input a drag-and-drop touch to touch the scroll bar SC as a starting point and touch Folder 1 as an end point at a specific point on the display unit 151.

Referring to FIG. 9(c), items moved to the scroll bar SC may be moved to the folder 1 according to the drop-and-drop touch of the user. Simultaneously, the scroll bar SC may be restored to the initial form and displayed. When there is no item moved to the scroll bar SC, the scroll bar SC is restored to the initial form to represent the no-item state, and thus the user can be aware of the no-item state intuitively.

Figure 10:
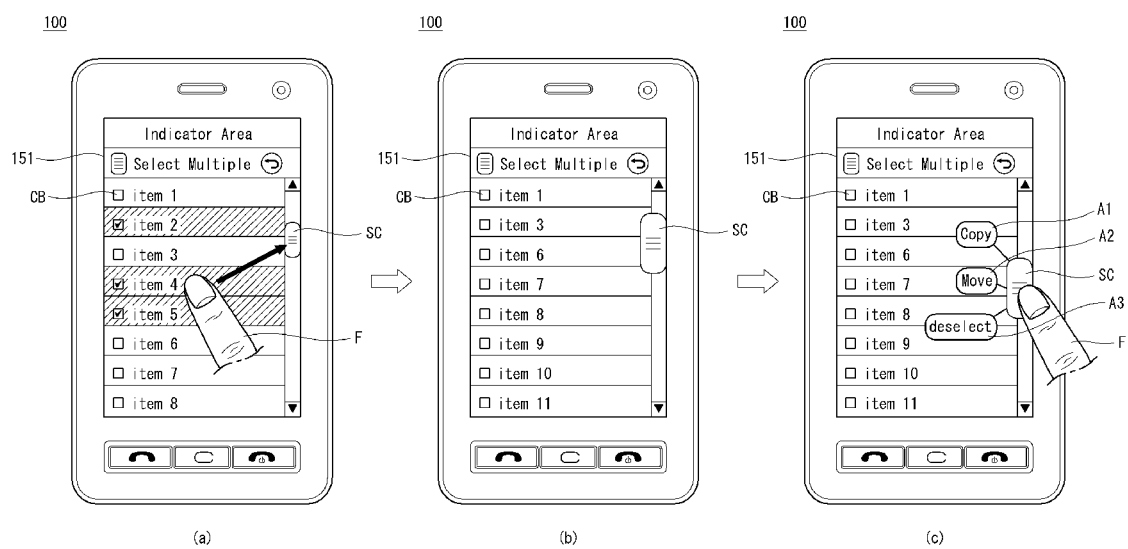
FIG. 10 illustrates an operation of the mobile terminal according to another embodiment of the present invention.

FIG. 10 illustrates an operation of the mobile terminal according to another embodiment of the present invention.

In the current embodiment of the present invention, the mobile terminal 100 may display menus A1, A2 and A3 near the scroll bar SC such that the user can conveniently use the mobile terminal 100.

Referring to FIGS. 10(a) and 10(b), the user may select an item and move the item to the scroll bar SC. When the item is moved, the appearance of the scroll bar SC can be changed.

Referring to FIG. 10(c), the user may touch the scroll bar SC. Here, the touch may be a touch-and-hold operation applied to the scroll bar SC. When the scroll bar SC is touched, the menus A1, A2 and A3 may be displayed.

When the menu A1, A2 or A3 is selected, the function of the selected menu may be executed on the item moved to the scroll bar SC. That is, the item moved to the scroll bar SC can be copied to a specific point when menu "copy" A1 is selected, the item can be moved to a specific point when menu "move" A2 is selected, and the item can be returned to the initial position when menu "deselect" A3 is selected.

The menus A1, A2 and A3 may be displayed according to the attribute of the item currently moved to the scroll bar SC. For example, a menu linked to a playing function may be displayed when a music file is moved to the scroll bar SC and a menu linked to a picture displaying function when a picture file is moved to the scroll bar SC.

Figure 11:
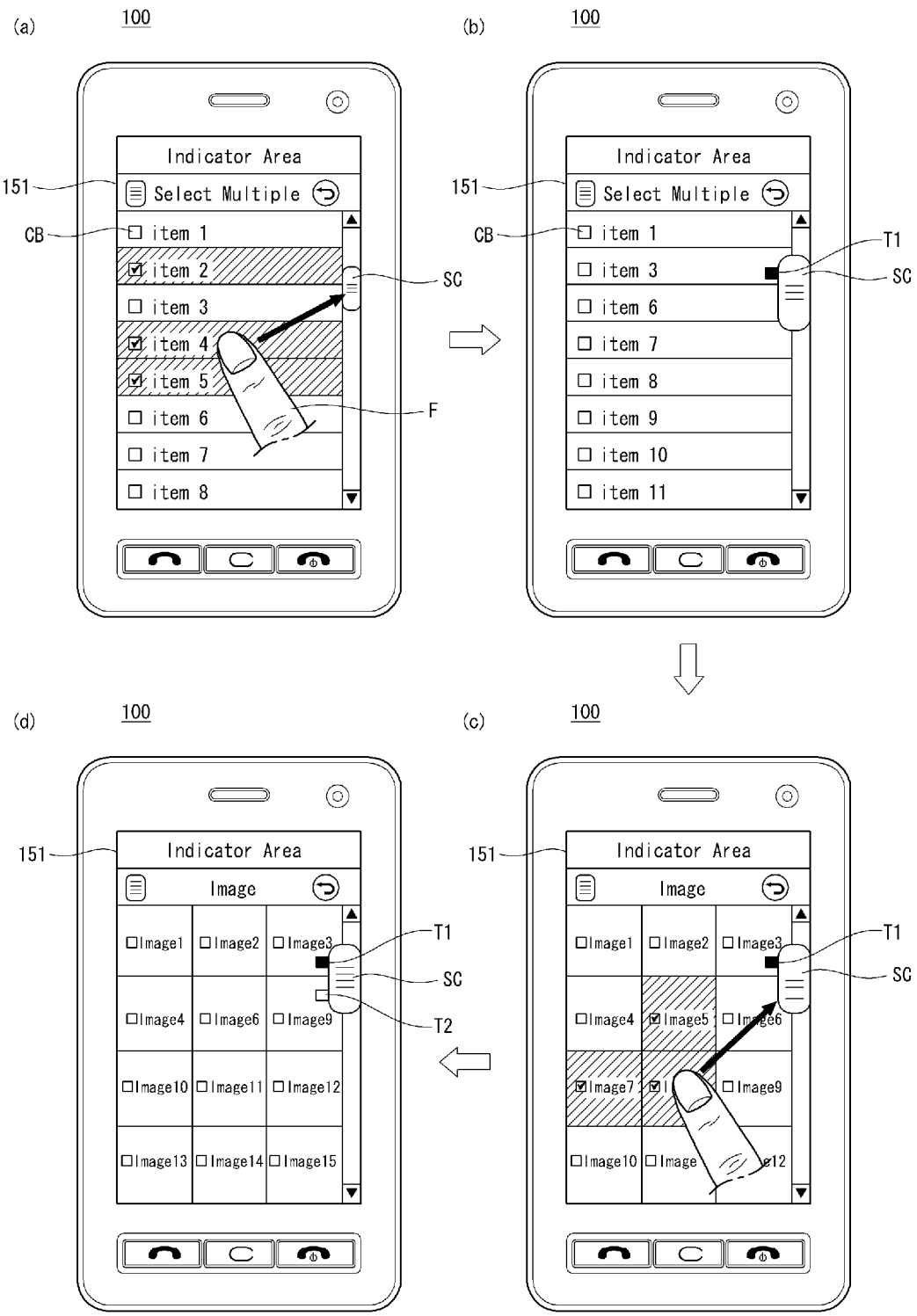
FIGS. 11, 12 and 13 illustrate an operation of the mobile terminal according to another embodiment of the present invention.
Figure 12:
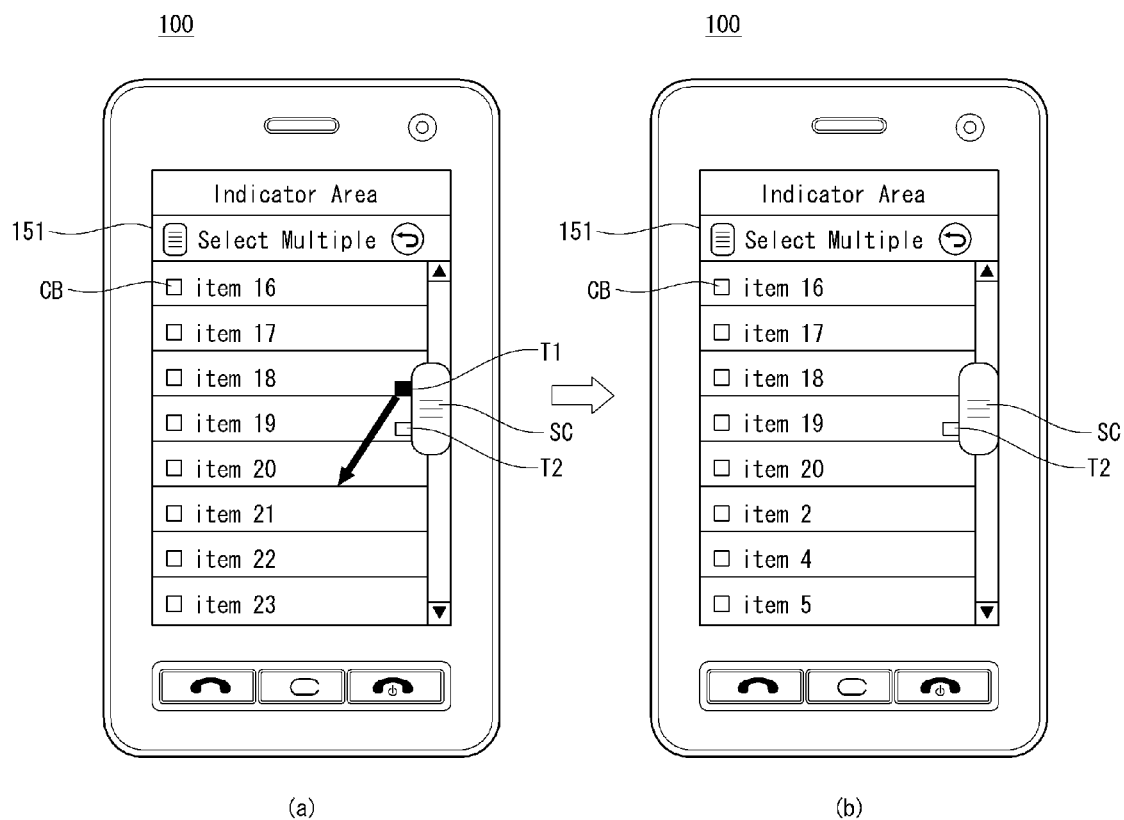
Figure 13:
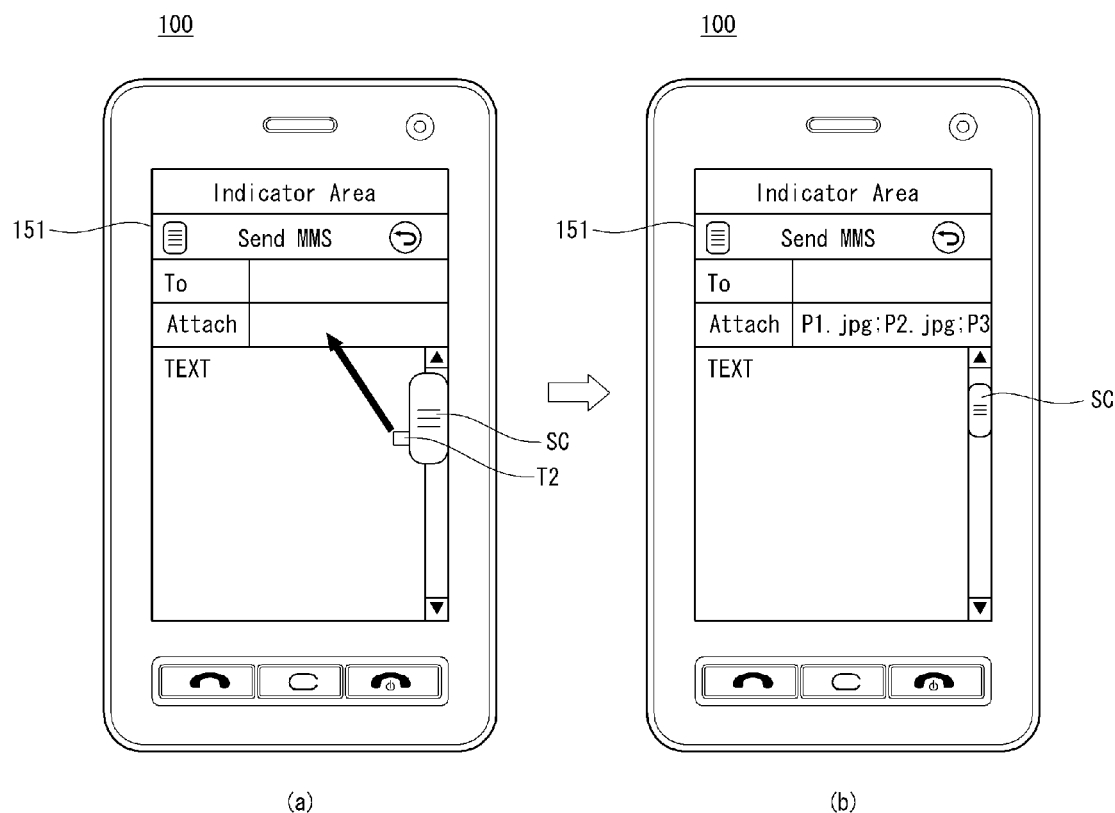

FIGS. 11, 12 and 13 illustrate an operation of the mobile terminal 100 according to another embodiment of the present invention.

In the current embodiment of the present invention, the mobile terminal 100 may display a tag on the scroll bar SC to allow the user to conveniently use the mobile terminal.

Referring to FIG. 11(a), the user may select items and move the selected items to the scroll bar SC through a touching operation.

Referring to FIG. 11(b), when the selected items are moved to the scroll bar SC, a first tag T1 may be display on the scroll bar SC. While FIG. 11(b) shows that the appearance of the scroll bar SC is changed and the first tag T1 is displayed, only the first tag T1 may be displayed without changing the appearance of the scroll bar SC. When the first tag T1 is added to the scroll bar SC, the user can be aware of moving of an item to the scroll bar SC.

Referring to FIGS. 11(c) and 11(d), the user may move image files to the scroll bar SC. When the image files are moved to the scroll bar SC, a second tag T2 can be displayed on the scroll bar SC.

The colors or positions of the first and second tags T1 and T2 may depend on the category of a file moved to the scroll bar SC. Accordingly, the user can easily recognize items moved to the scroll bar SC through the colors or positions of the first and second tags T1 and T2.

Referring to FIG. 12(a), the user may touch the first tag T1 to move the first tag T1 to a specific point on the display unit 151.

Referring to FIG. 12(b), items moved to the scroll bar SC may be moved to the specific point. Simultaneously, the first tag T1 may be deleted because the scroll bar SC does not include the moved items any more.

Referring to FIG. 13(a), the user may touch the second tag T2 to move the second tag T2 to a specific point on the display unit 151. In FIG. 13(a), the specific point corresponds to a region which his set such that a picture file can be attached to MMS.

Referring to FIG. 13(b), an item moved to the scroll bar SC may be moved to the specific point. Simultaneously, the second tag T2 related to the moved item may be deleted.

Figure 14:
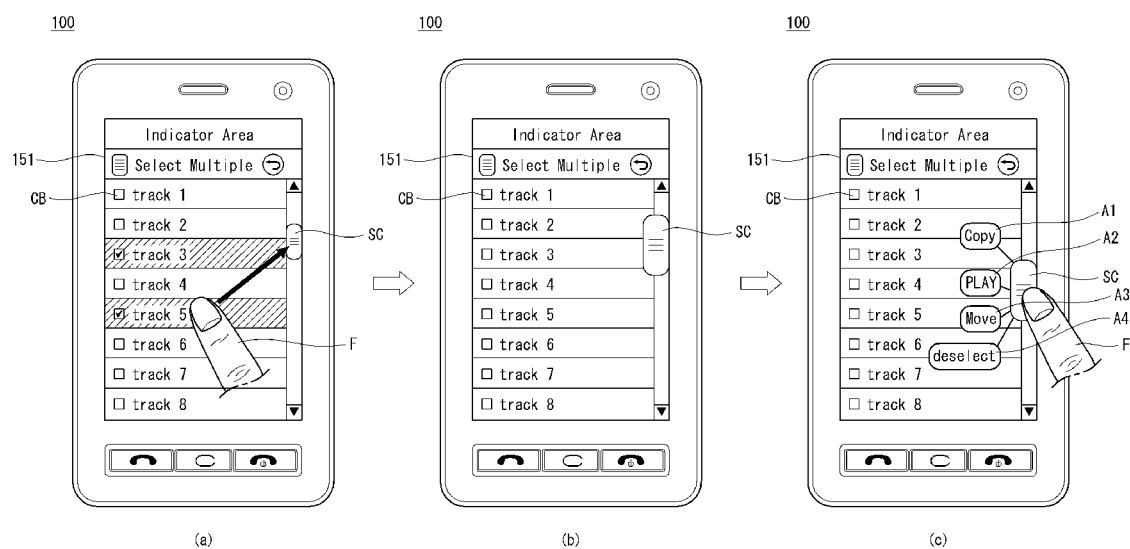
FIG. 14 illustrates an operation of the mobile terminal according to another embodiment of the present invention.

FIG. 14 illustrates an operation of the mobile terminal 100 according to another embodiment of the present invention.

In the current embodiment of the invention, menus may be displayed on the mobile terminal 100 according to icon types.

Referring to FIGS. 14(a) and 14(b), music files may be displayed on the display unit 151 and the user may select the music files and move them to the scroll bar SC.

Referring to FIG. 14(c), when the user touches the scroll bar SC, first, second, third and fourth menus A1, A2, A3 and A4 can be displayed. Here, the second menu A2 may be linked to a function of playing a moved item. While FIG. 14 shows music files as items, the displayed menus can be changed in various manners according to item types.

Figure 15:
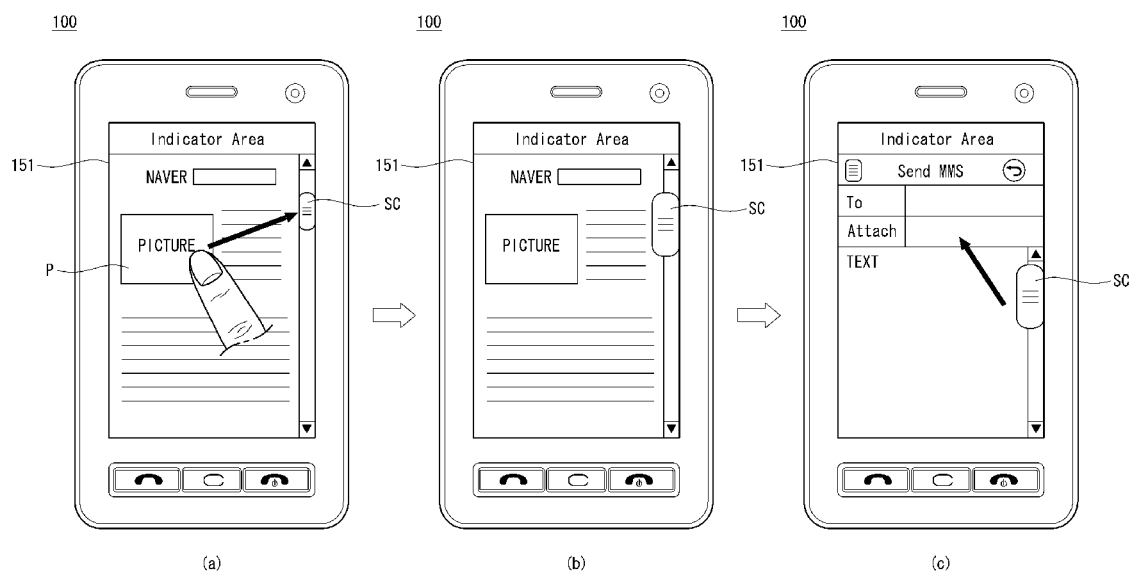
FIG. 15 illustrates an operation of the mobile terminal according to another embodiment of the present invention.

FIG. 15 illustrates an operation of the mobile terminal 100 according to another embodiment of the present invention.

In the current embodiment of the present invention, an item displayed in a web page may be moved to the scroll bar SC.

Referring to FIGS. 15(a) and 15(b), a web page may be displayed on the display unit 151 of the mobile terminal 100. The user may select a desired item, that is, a picture P, and move the picture P to the scroll bar SC. When the selected item is moved, the appearance of the scroll bar SC can be changed.

Referring to FIG. 15(c), the user may execute a desired function to move the item, which has been moved to the scroll bar SC, to a specific point on the display unit 151.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a touch screen configured to display at least one item and a scroll bar that receives a first touch signal for renewing the at least one item and displaying the at least one item; and
a controller configured to:
receive a second touch signal for selecting the at least one item and moving the selected item to the scroll bar;
execute a predetermined function related to the selected item; and
change the display state of the scroll bar.

2. The mobile terminal of claim 1, wherein the predetermined function deletes display of the selected item and moves the selected item to a virtual region corresponding to the scroll bar.

3. The mobile terminal of claim 1, wherein the predetermined function maintains display of the selected item and copies the selected item to the virtual region corresponding to the scroll bar.

4. The mobile terminal of claim 1, wherein the controller changes the predetermined function according to a selection signal of a user.

5. The mobile terminal of claim 1, wherein the controller displays an icon corresponding to the predetermined function on the scroll bar when receiving the second touch signal.

6. The mobile terminal of claim 1, wherein the controller changes the display state of the scroll bar such that at least one of the width and length of the scroll bar increases when receiving the second touch signal.

7. The mobile terminal of claim 6, wherein the controller increases at least one of the width and length of the scroll bar in proportion to the number of items moved according to the second touch signal.

8. The mobile terminal of claim 6, wherein the controller displays a tag on the scroll bar when receiving the second touch signal.

9. The mobile terminal of claim 8, wherein the controller changes at least one of the position and color of the tag according to the category to which the selected item belongs and displays the tag.

10. The mobile terminal of claim 1, wherein the controller changes the display state of the scroll bar such that the color of the scroll bar is varied when receiving the second touch signal.

11. The mobile terminal of claim 10, wherein the controller changes the color of the scroll bar in proportion to the number of items moved according to the second touch signal.

12. The mobile terminal of claim 1, wherein the controller displays menus related to the selected item when receiving a third touch signal applied to the scroll bar having the changed display state.

13. The mobile terminal of claim 8, wherein the controller displays menus related to the selected item when receiving a third touch signal applied to the displayed tag.

14. The mobile terminal of claim 1, wherein the controller moves the selected item to a specific point on the touch screen when receiving a fourth touch signal corresponding to a touch directed toward the specific point from the scroll bar having the changed display state.

15. The mobile terminal of claim 14, wherein the controller restores the display state of the scroll bar to the initial state when the selected item has been moved to the specific point.

16. The mobile terminal of claim 1, wherein the second touch signal corresponds to a drag-and-drop touch applied to the item as a starting point and applied to the scroll bar as an end point.

17. The mobile terminal of claim 1, wherein the second touch signal corresponds to a multi-touch applied to at least one of the item and then applied to the scroll bar.

18. A mobile terminal comprising:
a touch screen configured to display at least one item and a scroll bar; and
a controller configured to:
receive a second touch signal for selecting the at least one item and moving the selected item to the scroll bar;
execute a predetermined function related to the selected item; and
increase at least one of the length and width of the displayed scroll bar.

19. The mobile terminal of claim 18, wherein the predetermined function corresponds to at least one of a function of deleting display of the selected item and moving the selected item to a virtual region corresponding to the scroll bar and a function of maintaining the display of the selected item and copying the selected item to the virtual region corresponding to the scroll bar.

20. The mobile terminal of claim 18, wherein the controller moves the selected item to a specific point on the touch screen and displays the item when receiving a fourth touch signal corresponding to a touch directed toward the specific point from the scroll bar, and restores the scroll bar having the increased width or length to the initial state when the selected item has been moved to the specific point.

21. The mobile terminal of claim 18, wherein the controller displays a tag on the scroll bar when receiving the second touch signal.

22. The mobile terminal of claim 21, wherein the controller changes at least one of the position and color of the tag according to the category to which the selected item belongs and displays the tag.

23. A method of controlling a mobile terminal, comprising:
displaying at least one item and a scroll bar receiving a first touch signal for renewing the at least one item and displaying the at least one item;
receiving a second touch signal for selecting the at least one item and moving the selected item to the scroll bar;
executing a predetermined function related to the selected item; and
changing the display state of the scroll bar and displaying the scroll bar in the changed display state.

24. The method of claim 23, wherein the executing of the predetermined function comprises deleting display of the selected item and moving the selected item to a virtual region corresponding to the scroll bar.

25. The method of claim 23, wherein the executing of the predetermined function comprises maintaining display of the selected item and copying the selected item to the virtual region corresponding to the scroll bar.

26. The method of claim 23, wherein the changing of the display state of the scroll bar comprises changing the display state of the scroll bar such that at least one of the width and length of the scroll bar increases.

27. The method of claim 23, wherein the changing of the display state of the scroll bar comprises increasing at least one of the width and length of the scroll bar in proportion to the number of items moved according to the second touch signal.

28. The method of claim 23, further comprising receiving a selection signal of a user and changing the predetermined function.

29. The method of claim 23, further comprising displaying an icon corresponding to the predetermined function on the scroll bar when the second touch signal is received.

30. The method of claim 23, further comprising displaying a tag on the scroll bar when the second touch signal is received.

31. The method of claim 30, wherein the displaying of the tag comprises changing at least one of the position and color of the tag according to the category to which the selected item belongs and displaying the tag.

32. The method of claim 23, wherein the changing of the display state of the scroll bar comprises changing the display state of the scroll bar such that the color of the scroll bar is varied when the second touch signal is received.

33. The method of claim 32, wherein the color is changed in proportion to the number of items moved according to the second touch signal.

34. The method of claim 23, further comprising displaying menus related to the selected item when a third touch signal applied to the scroll bar having the changed display state is received.

35. The method of claim 30, further comprising displaying menus related to the selected item when a third touch signal applied to the displayed tag is received.

36. The method of claim 23, further comprising moving the selected item to a specific point on the touch screen when a fourth touch signal corresponding to a touch directed toward the specific point from the scroll bar having the changed display state is received.

37. The method of claim 36, further comprising restoring the changed display state of the scroll bar to the initial state when the selected item has been moved to the specific point.

38. The method of claim 23, wherein the second touch signal corresponds to a drag-and-drop touch applied to the item as a starting point and applied to the scroll bar as an end point.

39. The method of claim 23, wherein the second touch signal corresponds to a multi-touch applied to at least one of the item and then applied to the scroll bar.

\* \* \* \* \*